United States Patent
Oikawa et al.

(10) Patent No.: US 6,845,186 B2
(45) Date of Patent: Jan. 18, 2005

(54) OPTICAL CIRCUIT WITH HARMONIC GENERATOR

(75) Inventors: Masahiro Oikawa, Osaka (JP); Ken Yamashita, Osaka (JP); Koichiro Nakamura, Osaka (JP); Chandrasekhar Roychoudhuri, Storrs, CT (US); Vladimir V. Serikov, Bonita, CA (US)

(73) Assignee: Nippon Sheet Glass Co., Ltd., Osaka (JP)

(*) Notice: Subject to any disclaimer, the term of this patent is extended or adjusted under 35 U.S.C. 154(b) by 91 days.

(21) Appl. No.: 10/263,354

(22) Filed: Oct. 3, 2002

(65) Prior Publication Data

US 2003/0174926 A1 Sep. 18, 2003

Related U.S. Application Data

(60) Provisional application No. 60/363,847, filed on Mar. 14, 2002.

(51) Int. Cl.$^7$ ................................................. G02B 6/12
(52) U.S. Cl. ........................ 385/14; 385/15; 385/27; 385/31; 385/37; 385/39; 359/328; 359/329
(58) Field of Search ............................... 385/14, 15, 27, 385/31, 37, 39; 359/328, 329

(56) References Cited

U.S. PATENT DOCUMENTS

| | | | | | |
|---|---|---|---|---|---|
| 4,763,019 A | * | 8/1988 | Duguay et al. | ............. | 359/328 |
| 5,051,617 A | * | 9/1991 | Normandin et al. | ........ | 359/328 |
| 5,333,231 A | * | 7/1994 | Fukuda et al. | ............. | 385/122 |
| 5,390,210 A | * | 2/1995 | Fouquet et al. | ............. | 372/92 |
| 5,682,398 A | * | 10/1997 | Gupta | ......................... | 372/22 |
| 5,805,626 A | * | 9/1998 | Komatsu et al. | ............. | 372/41 |
| 6,204,957 B1 | * | 3/2001 | Yoshino et al. | ............. | 359/328 |
| 6,496,299 B2 | * | 12/2002 | Yamamoto et al. | ........ | 359/328 |

* cited by examiner

*Primary Examiner*—Akm Enayet Ullah
*Assistant Examiner*—Daniel Petkovsek
(74) *Attorney, Agent, or Firm*—Whitham, Curtis & Christofferson, P.C.

(57) ABSTRACT

An optical circuit is designed with demultiplexing and optical detection functionality with minimal crosstalk. An Nth order harmonic generation device is positioned before the demultiplexer to either convert the frequency or down convert the wavelength of the demultiplexed light wave by N-times. Upconverting the multiplexed signal at the receiver station is performed by either simultaneously upconverting N-times to create N times the original spacing between each optical channel or by upconverting the frequency of one optical channel at a time.

14 Claims, 9 Drawing Sheets

OPTICAL CIRCUIT WITH HARMONIC GENERATOR

This application claims priority of U.S. Provisional Patent Application Ser. No. 60/363,847, filed Mar. 14. 2002.

BACKGROUND OF THE INVENTION

The present invention is related to functional devices for optical fiber communication, especially to optical circuit for wavelength division multiplexed optical communication systems.

In optical fiber communication, the wavelength division multiplexing is a method for increasing of communication capacity with an optical fiber. In this method, a plurality of carriers with different wavelengths, each for a different WDM channel, is modulated with different binary modulation signals. These modulated carriers are multiplexed and transmitted with an optical fiber. At the receiver side, the transmitted carrier is demultiplexed to original wavelengths and the respective signals are detected.

In the 1550 nm wavelength band usually used for optical fiber communication, actually carrier frequencies with the spacing of $\Delta v$=50 to 100 GHz are standardized. Because the frequency spacing of 50 GHz corresponds to the wavelength spacing of about 0.4 nm, a wavelength demultipler with a resolving power of at least R=3871 (by Rayleigh criterion) is required. The multiplexer or the demultiplexer could be any one of the standard commercial devices like a grating, or a dichroic beam splitter, or an array waveguide grating, or a tandem of Fabry-Perot etalons, etc. The modulation rate, on the other hand, is getting faster for increasing the transmission capacity. The high bit-rate modulation of carrier in time regime causes spectral fringe broadening in the frequency regime because of shorter data pulses. Therefore crosstalk is liable to occur between adjacent channels whose wavelengths are close to each other. Thus indefinite and simultaneous increase of WDM channel density (i.e. channel separation) and increase of data rate per channel (i.e. shorter data pulse) are not compatible.

SUMMARY OF THE INVENTION

The object of the present invention is to solve the above problem by offering the optical circuits having demultiplexing and optical detecting function with small crosstalk even in the case of small wavelength spacing and high bit-rate modulation. The present invention is based on the following optical communication system.

For a WDM system with n channels, a plurality of n optical sources generate carriers with n unique wavelengths by their individual data modulators. Then a wavelength multiplexer combines the modulated carriers. The multiplexed wave is coupled to an optical fiber and propagated. On the receiver side, a wavelength demultiplexer separates the propagated wave to a plurality of modulated carriers with different wavelengths again. Then, a plurality of photodetectors detect the separated signals and transforms them to electrical signals. The present invention is featured by inserting an N-th order harmonic generation device before the demultiplexer. It up- converts the frequency (or down converts the wavelength) of the demultiplexed light wave by N-times.

There are two possible system approaches to up-convert the multiplexed signal at the receiver station. First, all the optical channels (frequencies) can be simultaneously up-converted N-times, creating N times the original $\Delta v$ spacing between each optical channel. This reduces the resolution requirement of the demultiplexer by N times.

The alternative way is to up-convert the frequency of one optical channel at a time through a finely tuned nonlinear frequency up-converter. Then separate (demultiplex) only this up-converted channel from the rest of the channels continuing with the fundamental frequencies. Repeat this step sequentially n time for the n multiplexed channels. Now, in each step, the channel separation is approximately $N\Delta v$ instead of $\Delta v$. This, of course, reduces the resolution requirements significantly and one can use a simple dichroic mirror (beam splitter).

In the system described above, since wavelengths in 1550 mn band is converted to around 780 nm, an Si based photodiode can be applied instead of InP based one. Therefore the receiver side of above system can be realized as an integrated optical circuit based on $SiO_2$/Si optical waveguides.

According to this invention, the basic unit of optical circuit is comprising a second harmonic generation (SHG) device, an optical waveguide with light emission means and a photodetector, wherein these devices are integrated on a substrate and the input light signal is coupled to and propagated in the above devices in above order. A plurality of basic units of the optical circuit are coupled in series each other or to the output ports of branching waveguide.

It is preferred that the substrate comprises an Si wafer and the waveguide is comprises $SiO_2$ based materials. The SHG device is based on an $SiO_2$ waveguide introduced periodic structure. The photodetector has pn junction fabricated on the Si substrate. The light emitting means is a Bragg diffraction grating formed on the surface of the $SiO_2$ waveguide.

Since the optical circuit of the present invention includes second harmonic generation devices, wavelengths in 1550 nm band used in the optical communication field are converted to wavelengths around 780 mn. Thus Si based devices can be applied as photodetectors. Furthermore, whole optical circuit can be formed with Si/$SiO_2$ system. This makes easy the fabrication process and integration with Si based electronic circuits. In other words, this invention has advantages that this optical circuit chip integrated on a substrate can perform demultiplexing optical signals, converting of the optical signals to electrical signals and processing the electrical signals.

DETAILED DESCRIPTION OF PREFERRED EMBODIMENT

The preferred embodiments of the present invention are described referring FIGS. 1 through 9.

Figure 1:
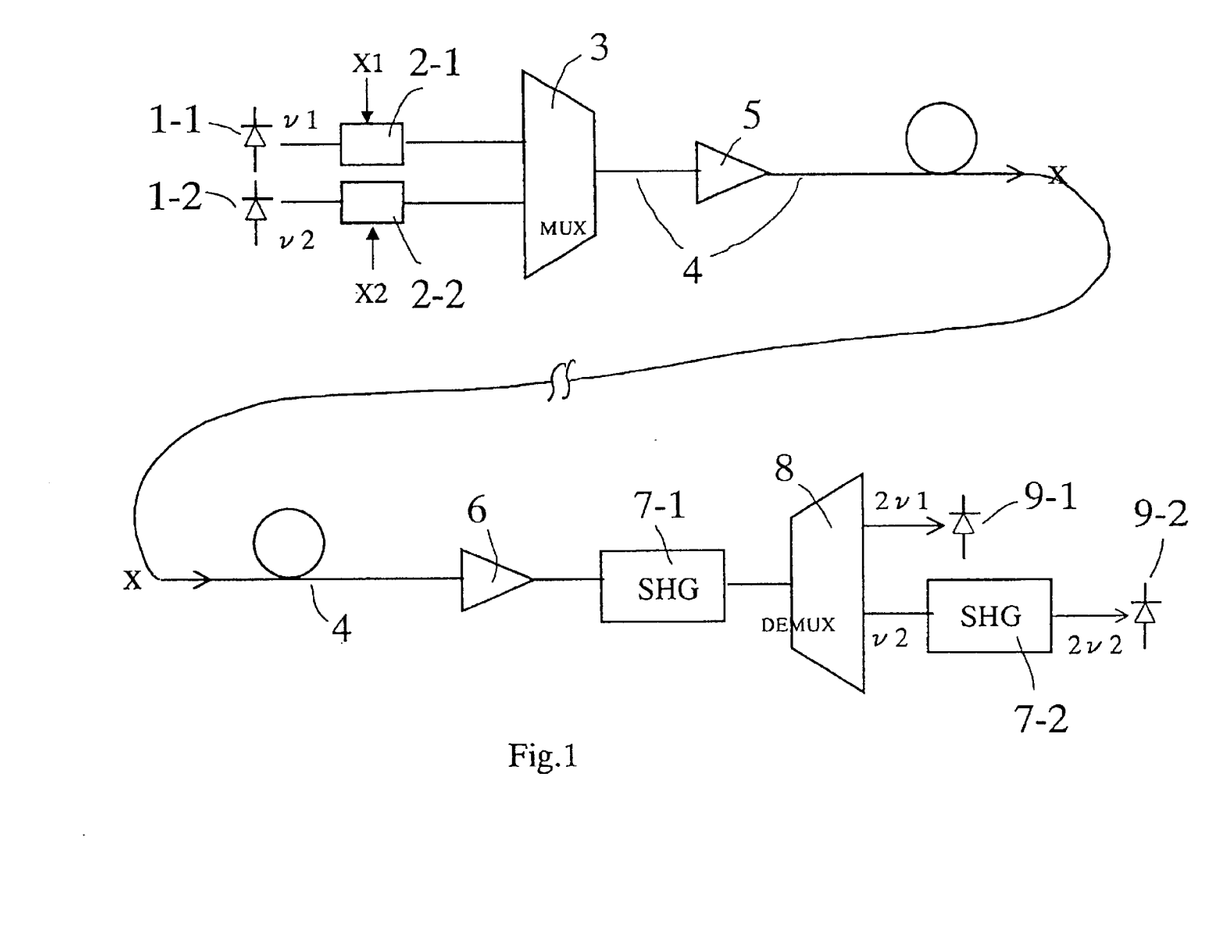
FIG. 1 shows a schematic diagram of the basic optical communication system according to the present invention.

FIG. 1 shows the basic arrangement of the optical communication system of the present invention. To describe the basic arrangement, the simplest two-channel system having two carriers with different frequencies is shown. The present invention is, however, essentially effective for the optical system having a plurality of channels with close frequency spacing. More specific arrangement of practical systems having multiple channels will be described later.

Figure 2:
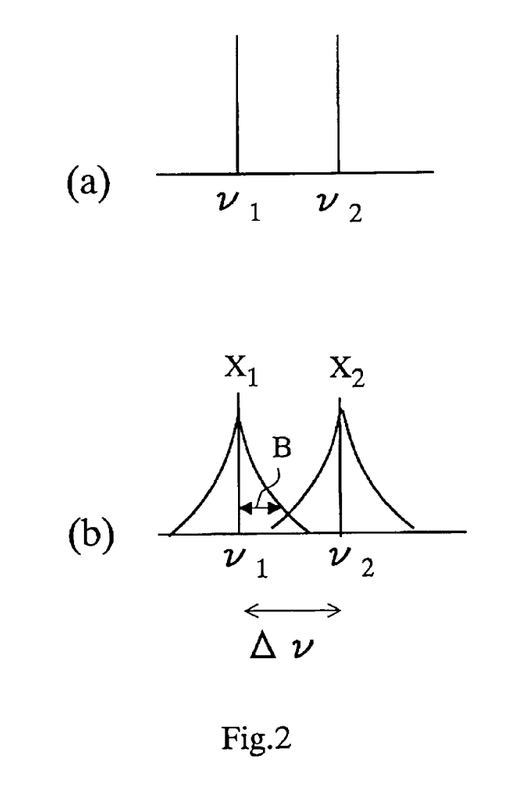
FIG. 2 shows (a) frequency spectra of two carriers and (b) that of modulated carriers.

As shown in FIG. 1, two optical sources 1-1, 1-2 with two different frequencies ν1, ν2 are prepared. FIG. 2(a) shows frequency spectrum of carriers generated with these optical sources. These carriers are modulated in binary amplitude with time sequence of pulses X1, X2 using optical modulators 2-1, 2-2. If the modulation rate of the time sequence of pulses is B bit/sec, frequency spectrum of modulated carriers are broadened to approximately B Hz as shown in FIG. 2(b). Therefore in case of smaller frequency spacing than B Hz, the crosstalk is liable to occur between the adjacent channels.

At the transmitting station, the modulated carriers n-WDM channels are combined to a single beam of light with a wavelength multiplexer 3, and coupled to an optical fiber 4 and transmitted. The wavelength multiplexed light is amplified with optical amplifiers 5, 6 if required in order to compensate for (1) the attenuation through a long haul optical transmission fiber, and (ii) to generate the second harmonic wave with high efficiency on the next stage as describing below.

At the receiving station, the wavelength multiplexed light is put through a second harmonic generator (SHG, N=2) 7-1, wherein frequency component ν1, for example, is doubled to 2ν1 (The wavelength is converted to a half). The frequency converted carrier and non-converted carrier are separated with a wavelength demultiplexer 8, and the optical signal which modulates the frequency converted carrier is converted to the electrical signal (X1) with the photodetector 9-1. Then the carrier of non-converted frequency ν2 is input to the SHG device 7-2 and doubled the frequency to 2ν2, and the optical signal is converted to the electrical signal with the photodetector 9-2. Although the frequency component ν2 may be input to the photodetector as it is, it is preferred to convert the frequency for the reason described below.

Figure 3:
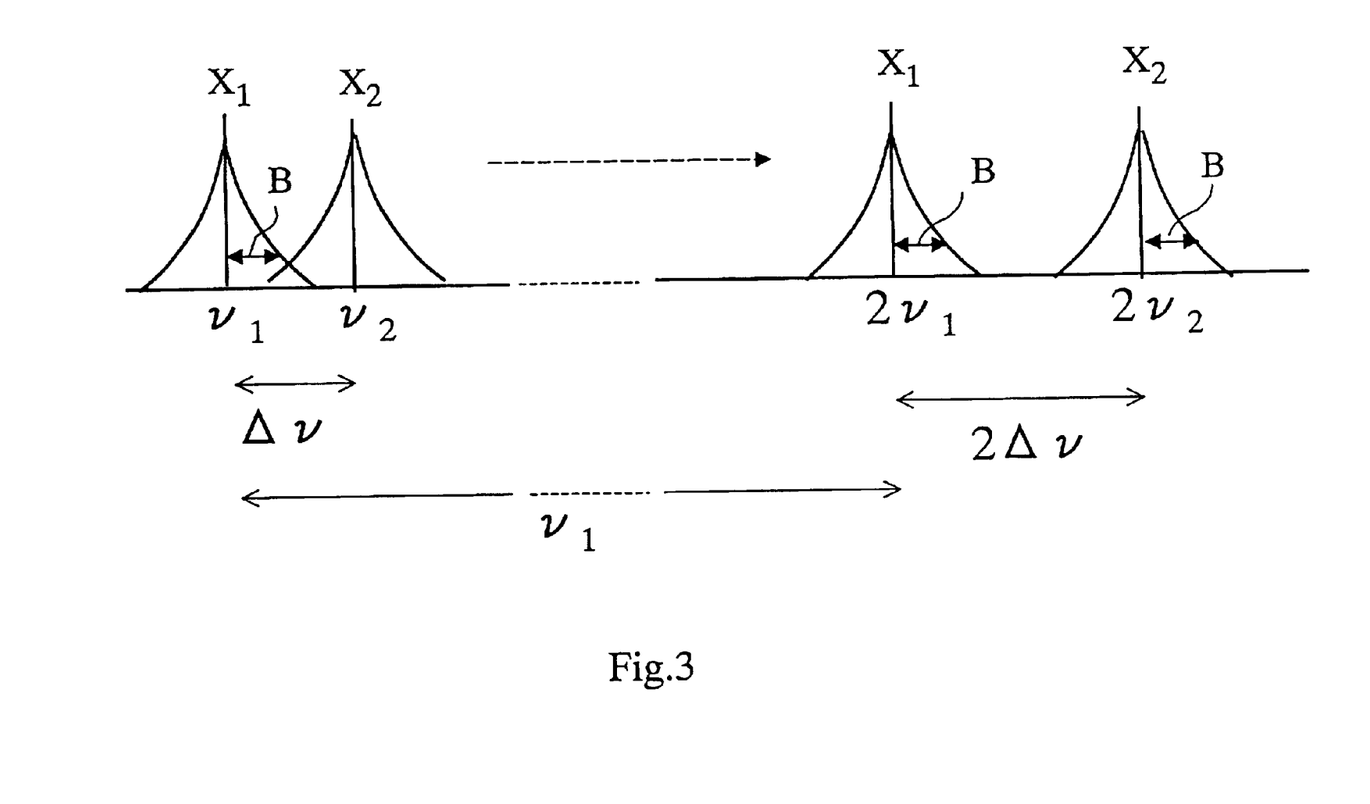
FIG. 3 shows frequency spectra of two modulated carriers before and after the frequency conversion.

As shown in FIG. 3, since the frequency spacing of the above two carriers after frequency conversion is doubled, the crosstalk between the two channels is reduced significantly. Furthermore, as the frequency spacing Δν(=ν2−ν1) between channels before the frequency conversion is very narrow, the frequency spacing between that of converted component and non-converted component is about ν1 which is much wider compared with Δν. This leads to a significantly reduced demand on the resolving power of the wavelength demultiplexer.

Based on the basic arrangement above of the present invention, a specific embodiment is described below.

Figure 4:
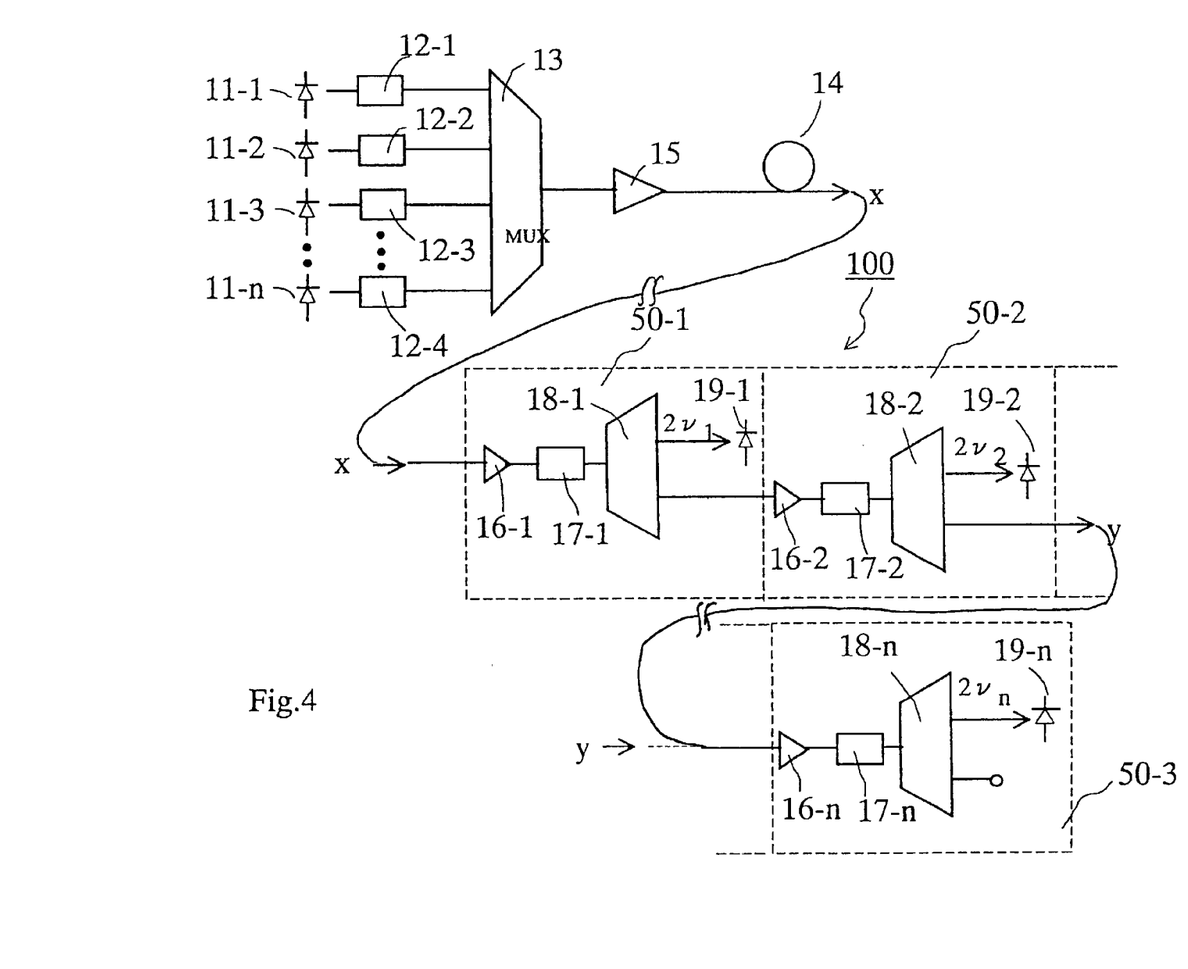
FIG. 4 shows a schematic diagram of the optical communication system of preferred embodiment.

As shown in FIG. 4, semiconductor lasers 11-1, 11-2 and 11-3 are prepared as optical sources of frequency ν1 (193400 GHz, wavelength λ1=1550.12 nm), ν2 (193450 GHz, λ2=1549.72 nm), and ν3 (193500 GHz, λ3=1549.32 nm). The frequency spacing Δν is 50 GHz and the wavelength spacing Δλ is about 0.4 nm. For simplicity, numerical examples were shown for three channels only. Actually required number (n) of optical sources with frequency spacing of 50 GHz should be prepared. The wavelength stabilized distributed feedback type of semiconductor laser is preferred for these purpose.

The generated carriers are modulated in binary amplitude with LiNbO$_3$ optical modulators or the like 12-1. 12-2 and 12-3 by time sequence of pulses X1, X2. X3 . . . , Xn of modulation velocity of 10 Gbps respectively. The spectral broadening is about 10 GHz.

The modulated carriers are combined with a wavelength multiplexer 13 to the wavelength multiplexed light wave, and then coupled to an optical fiber and transmitted. The wavelength multiplexed light wave should be amplified with a erbium doped optical fiber amplifier (EDFA) 15 to compensate for the attenuation during transmission through fiber. In the present embodiment, after transmission for required distance, the light wave is amplified up to the power of about 100 mW using EDFA 16.

Then the wavelength multiplexed light wave is input to an SHG device 17-1. Since the SHG device 17-1 is kept phase-matching only for very narrow bandwidth at the center wavelength of ν1, only the light wave of the frequency of ν1 is doubled to 2ν1. The wavelength is converted to λ1/2=775.06 nm. On the other hand, SHG device 17-1 is not matched to the phase of the frequency range from ν2 to νn. Therefore the waves in this frequency range are not frequency doubled.

The modulated carrier converted to frequency of 2ν1 is separated from the non-converted wavelength multiplexed light wave with a wavelength demultiplexer 18-1. The separated modulated light signal is converted to electrical signal with a photodetector 19-1. Because the frequency spacing between 2ν1 and ν2 is 193350 GHz, which is very much wider than the original spacing of 50 GHz between ν1 and ν2, the required performance of the wavelength demultiplexer is very much relaxed and a demultiplexer having relatively small wavelength resolution can be used. As a photodetector 19-1, a Si based photodiode can be applied because the wavelength is converted to 780 nm range.

Next, the second carrier (frequency:ν2) is converted in frequency with an SHG device 17-2, separated with a wavelength demultiplexer 18-2, and converted to electrical signal with a photodetector 19-2. Also carriers of the frequency from ν3 to νn−1 are converted in frequency with SHG devices 17-3~17-(n−1). Finally the carrier of the frequency of νn is input to an SHG device 17-n, and converted to the frequency of 2νn. Then the optical signal is converted to electrical signal with a photodetector 19-n. Although the last frequency of νn may be converted as it is, it is preferred to convert in frequency, because the use of the common Si photodiode as the photodetector 19-n has advantage for the system design.

In the optical communication system according to the present invention, the crosstalk between channels can be almost completely suppressed, because only the frequency of each channel is converted with each SHG device. And demultiplexing is very easy due to the large difference between the converted wavelength and the non-converted wavelength. Furthermore, Si based photodetectors are applicable to 780 nm wavelength band converted from 1550 nm band.

This invention has been made in view of the fact that all functional devices in frames shown by the broken line in FIG. 4 can be integrated as an optical circuit on an Si substrate. In this case, the section in a frame is a basic unit 50 of the optical circuit of the present invention. A plurality of the basic units 50-1, 50-2, . . . are connected in series or in parallel accordingly to the number of carriers.

Figure 5:
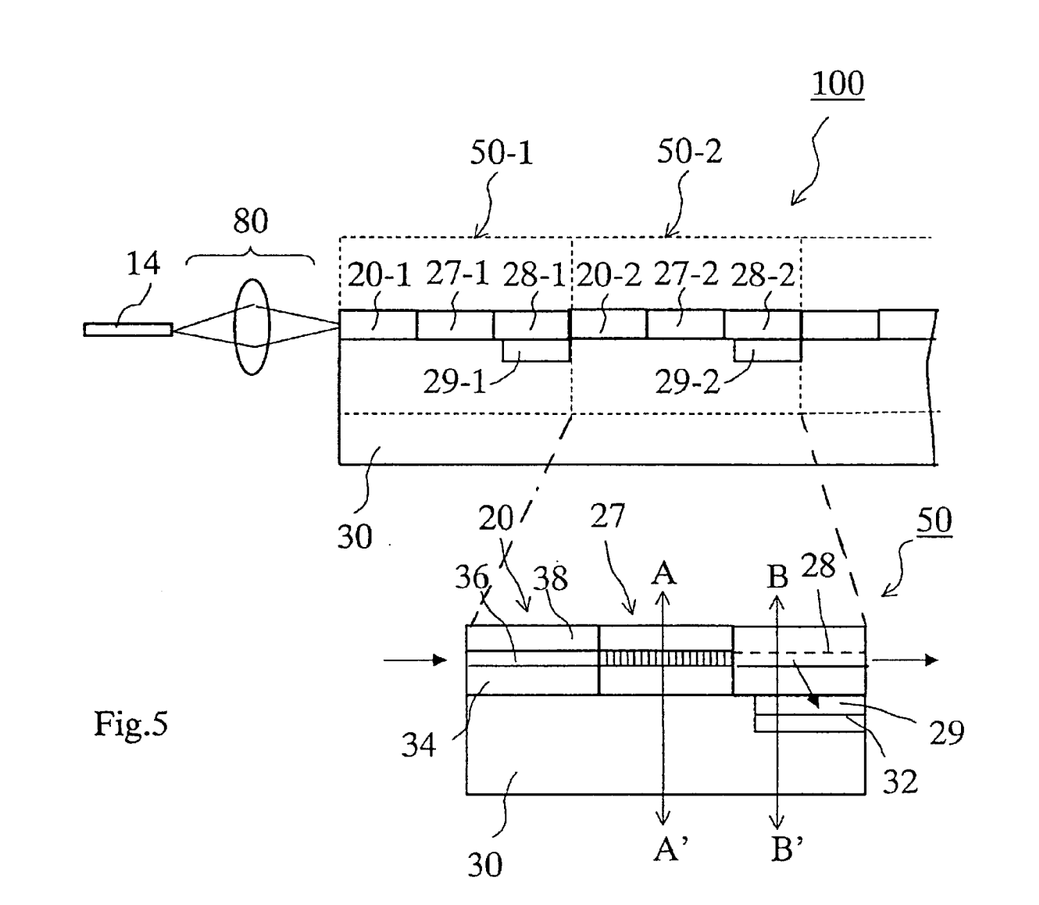
FIG. 5 shows a cross sectional view of the optical circuit integrated on the substrate and its basic unit.

FIG. 5 shows the cross sectional view of the optical circuit 100 integrated on an Si substrate, wherein the basic units 50 of the optical circuit are connected in series. The light converging system 80 for coupling the emitted wavelength multiplexed light wave from the optical fiber 14 to the edge surface of the waveguide is not included in the optical circuit of the present invention.

Figure 6:
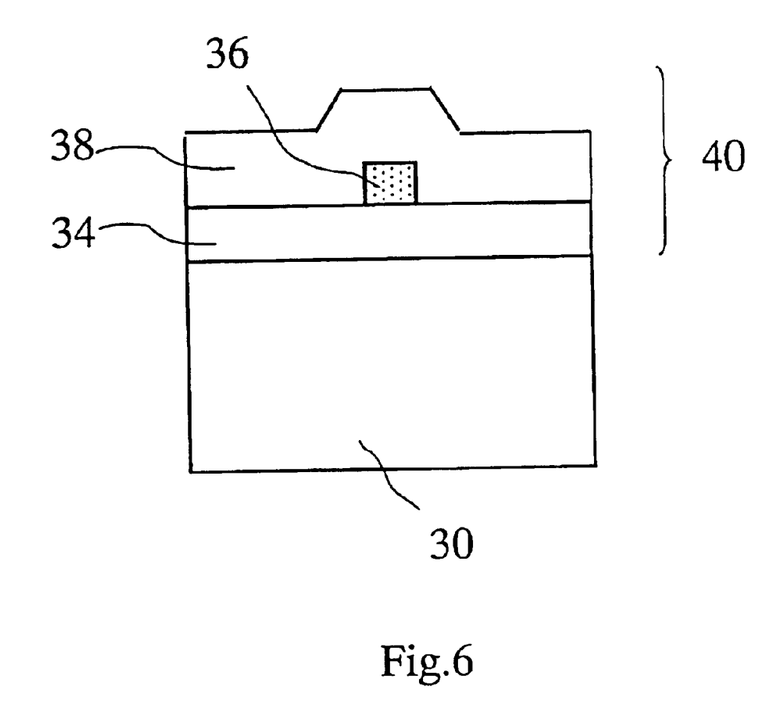
FIG. 6 shows a cross sectional view of the optical circuit at the location of an SHG device.
Figure 7:
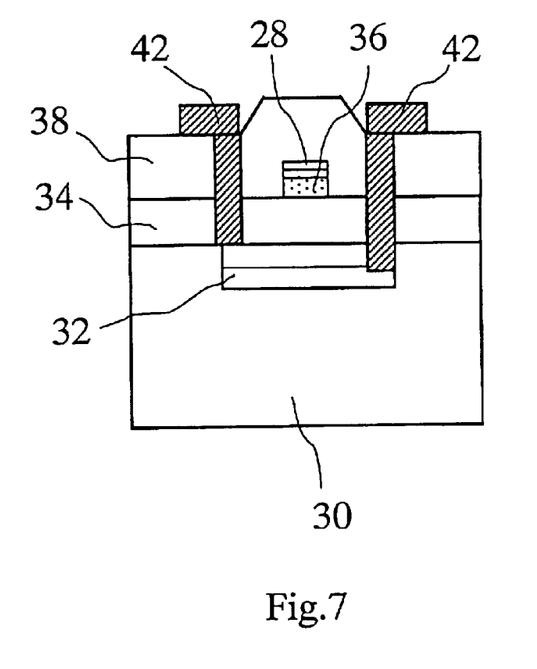
FIG. 7 shows a cross sectional view of the optical circuit at the location of a Bragg diffraction grating and a photodetector.

The basic unit 50 of the optical circuit 100 is described below according to the fabrication process. FIG. 6 is the cross sectional view of the optical circuit along the line A–A' in FIG. 5, and FIG. 7 is the cross sectional view along the line B–B'.

First, pn junctions 32 are formed for photodetector 29 at the predetermined position on the surface of Si substrate by impurity diffusion or by ion implantation or the like. Then, an optical waveguide 40 with $SiO_2$ based materials. At first, an $SiO_2$ layer of which thickness is about 10 $\mu$m is deposited by the chemical vapor deposition technique or the like. Some components like $B_2O_3$ may be doped for adjusting the refractive index. This layer works as a lower clad layer 34 of the waveguide. And then an $SiO_2$ layer doped 10% $GeO_2$ is deposited to the thickness of about 6 $\mu$m. As this layer has a higher refractive index than the $SiO_2$ layer, it works as a core layer 36. The international non-examined patent; WO96/34304 teaches some components of $SnO_2$ or the like is preferred to add for photo-induced refractive index change in the process followed.

In order to form a channel waveguide, the Ge doped $SiO_2$ layer 36 is patterned by the photolithographic technique. A stripe shaped portion of 6 $\mu$m wide is remained and other portions are removed by etching. For the etching, the liquid phase etching using hydrofluoric acid based etchant or the gas phase etching like the reactive ion etching can be applied. The etching is stopped as soon as the Ge doped $SiO_2$ layer is completely removed.

Phosphor ions are implanted to the predetermined potion to form SHG devices 27. And then a upper clad layer 38 having the same component as the lower clad layer 34 is deposited over the core 36. Furthermore holes through both clad layers 34 and 38 are made at the position of pn junction 32 n the Si substrate 30 to form metal electrodes of photodetector 29. On the exposed potion portion of the pn junction 32, metal electrodes 42 are deposited by vacuum evaporation or the like.

The SHG device 27 is formed by introducing a structure in which the refractive index varies with a specific period in the core layer of the waveguide along the propagated direction of light. To introduce the structure, the ultraviolet light beam from a KrF excimer laser are irradiated through a phase mask having a specific periodical pattern as described below. The periodic structure is formed by this irradiation to the waveguide region where P ions are implanted. This device can double only the specific frequency for which it is designed.

A Bragg grating 28 is formed on the surface of the waveguide followed to the SHG device as a demultiplexer, and also as a light emitting means. The position of the grating 28 is aligned to the position of the pn junction 32 on the Si substrate 30. The periodical structure of the grating may be introduced with changing refractive index periodically by photoinduced method like the method for the SHG device described above. In this case, it is possible to form the structure by the light irradiation after the deposition of the upper clad layer.

However, the period of the grating is shorter than that of the SHG device because the grating must diffract the wavelength of 780 mn. It is sometime difficult to prepare a phase mask corresponding to such a short period. In such case, so-called relief type grating may be formed on the surface of core layer by the two-beams interference exposure technique using an He—Cd laser or the like as a light source. This type of grating must be made before the deposition of upper clad layer. The exposure to a photoresist layer on the surface of core layer so as to adjust the period of interference fringe to a required value. After the mask with the specific periodic structure is formed by developing the resist, the periodic relief structure is fabricated by etching.

This Bragg grating 28 has both function as a demultiplexer reflecting a specific wavelength and a light emission means from the waveguide.

It is also preferred to give the light amplification function to the input waveguide 20 or the elsewhere in the basic unit 50 to compensate the propagation and coupling losses of the waveguides. This function corresponds to the light amplifiers 16-1, 16-2, . . . as shown in FIG. 4 and is realized by doping erbium or the like to the core layer.

The optical circuit described above is a basic unit 50, which can be coupled in series repetitively for demultiplexing and detecting the frequencies of ν2, ν3, . . . unit by unit. As shown in FIG. 4, the optical circuit 100 of the present invention is built by connecting the required number of the basic units 50-1, 50-2, . . . in series, which comprises the input waveguides 20-1, 20-2, . . . to couple the incident light to the edge surface, the SHG devices 27-1, 27-2, . . . , the diffraction gratings 28-2, 28-2, . . . , and photodetectors 29-1, 29-2, . . . fabricated on the Si substrate 30. All the optical circuit may be formed on the same substrate, but also some appropriate number of basic units may be formed on the substrate and coupled each other as required. According to the above description, the optical circuit 100 which integrates the surrounded part of the circuit as indicated by broken lines in FIG. 4.

Figure 8:
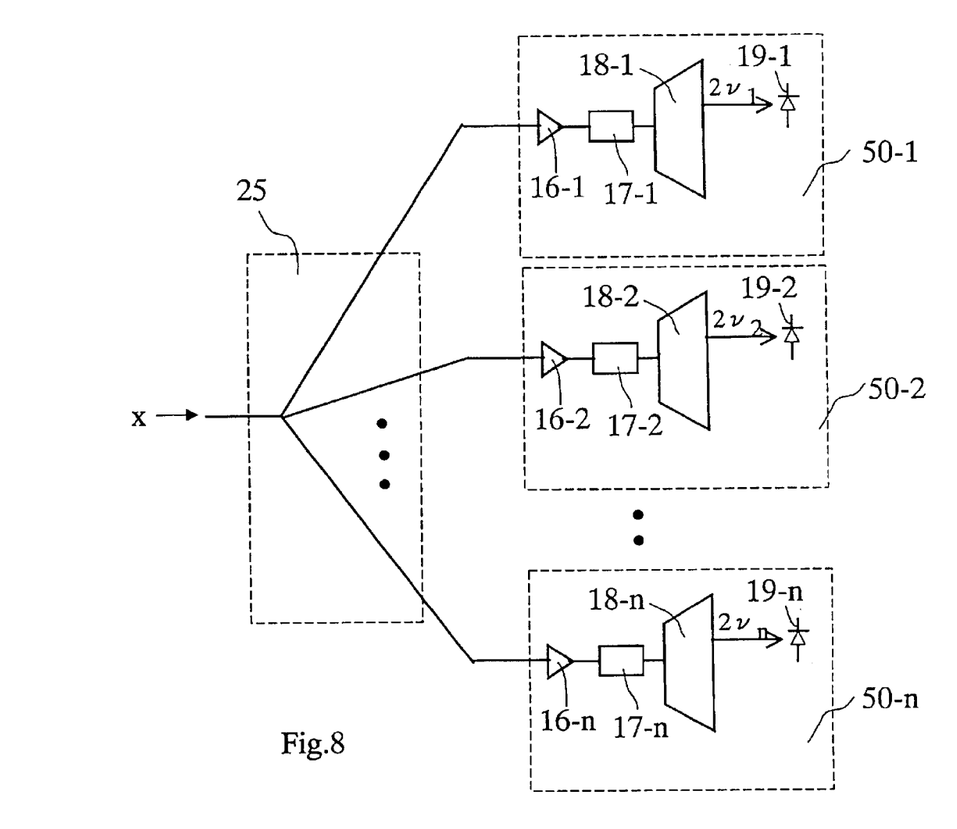
FIG. 8 shows a schematic diagram of the optical communication system of another preferred embodiment.
Figure 9:
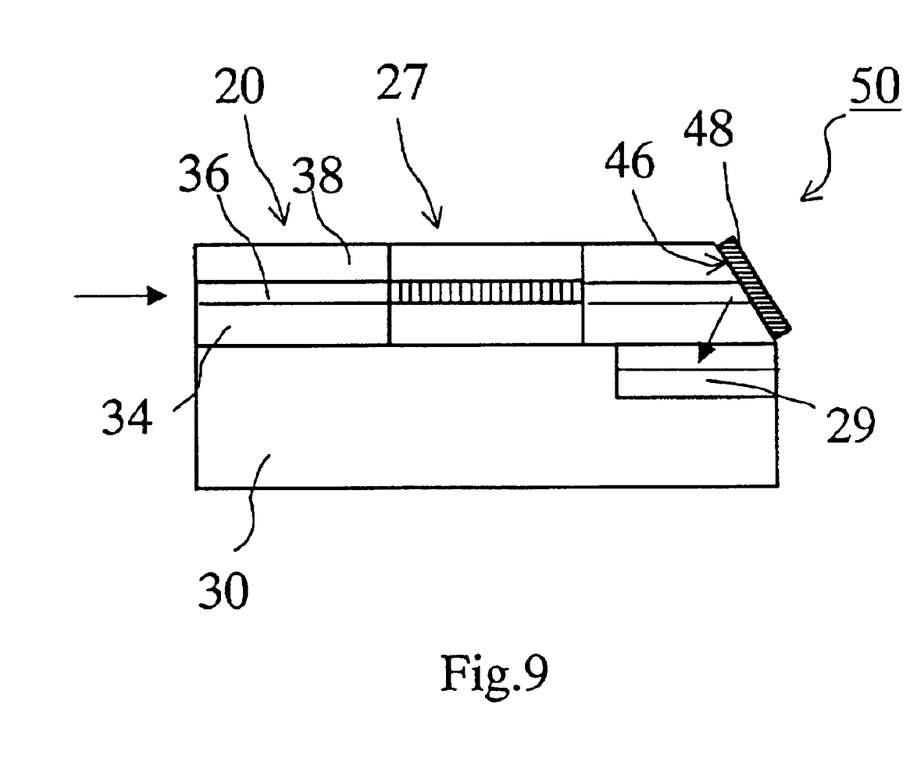
FIG. 9 shows a cross sectional view of a basic unit of the optical circuit of another embodiment.

Another embodiment of the optical circuit is shown in FIG. 8. A branching waveguide 25 is disposed at the input of the optical circuit. This waveguide 25 branches the wavelength multiplexed light wave and the lights are coupled to the basic units 50-1, 50-2, . . . respectively. The SHG devices in each basic unit convert a narrow specific frequency range only. In case of this arrangement, since there is no optical circuit to send non-converted light, it is possible to reflect the converted light with a filter 48 or the like and input it to the photodetector 29. The filter 48 is disposed on the edge surface 46 of the waveguide which is polished to a oblique face for the propagation direction of the waveguide as shown in FIG. 9. The filter 48 is preferred to be a multi-layered dielectric film which is formed directly or adhered one deposited on some substrate on the edge surface 46 of the waveguide. This arrangement has an advantage that the required specification of the filter is not so severe because the wavelength after conversion is quite different from that of non-converted one. Also it has another advantage as follows. The incident light powers to the respective basic units are attenuated with some insertion loss of the branching waveguide but are uniform. Therefore the optical circuit of this arrangement does not suffer to the problem in series connection that the propagation loss increases as the number of basic units increase.

To build the above system of the present invention, specific SHG devices are required which are respectively adjusted for phase-matching to only one frequency of each carrier. The used SHG device in this embodiment is a quasi-phase-matching (QPM) device 2 which has a structure of periodical refractive index change in $SiO_2$ optical waveguide along the light propagation direction. The QPM condition in an optical fiber which has the core of P doped germanosilicate glass is shown in the literature: J. Modern Optics, Vol.37, No.3, p.327 (1990) etc. The planar waveguide having the similar glass components can form this QPM device.

In case of doubling the frequency v1, the period Λ1 is determined as follows. The phase-matching condition is shown by the following equation, $$2\beta_1(v)+K_1=\beta_1(2v),$$

where $\beta_1(v)$ and $\beta_1(2v)$ are the propagation constants of the waveguide for light frequencies of v1 and 2v1, respectively. And $K1=2\pi/\Lambda 1$. If the propagation constants is expressed by effective refractive indices $N_1(v)$ and $N_1(2v)$, the above equation is rewritten as $$\Lambda 1=(\lambda 1/2)/(N_1(2v)-N_1(v)).$$

Here λ1 is the wavelength corresponding to the frequency v1 (λ1=c/v1, where c is the velocity of light.).

Also the period Λ2 for the adjacent channel of frequency v2 (wavelength λ2) is determined by the similar relation. Here, the wavelength spacing between both channel is Δλ (=λ2−λ1), and the variation of effective refractive indices are $\Delta N_{12}(v)$, $\Delta N_{12}(2v)$. Then, Λ2 is expressed as, $$\Lambda 2=((\lambda 1+\Delta\lambda)/2)/((N_1(2v)-N_1(v))+(\Delta N_{12}(2v)-\Delta N_{12}(v))).$$

Since the refractive index of the core layer has wavelength dispersion, the absolute values of refractive indices are different in between the wavelength bands of 1550 nm and 780 nm, and also the variations of refractive indices for wavelength are not equal. Δλ (~0.4 nm) is negligibly small as compared with λ1 (~1550 nm). However, $(\Delta N_{12}(2v)-\Delta N_{12}(v))$ is not negligible against $(N_1(2v)-N_1(v))$. Therefore Λ2 can not be regarded as the equal value to Λ1 for even such a small change of wavelength Δλ. This means that the efficiency of second harmonic generation of the SHG device designed for the channel of frequency v1 is quite low for frequency v2. A width of wavelength at half maximum of SHG output depends on the length L of domain-inverted region. If the length L is approximately 5 cm, the width of wavelength is less than 0.2 nm. Thus the QPM device has enough performance to apply for the case of frequency spacing of 0.4 nm. If the QPM devices having the periods of domain-inversion of Λ1, Λ2, . . . , Λn for the frequencies of v1, v2, . . . , vn can be prepared, the optical communication system as shown in FIG. 2 is possible to be constructed.

In above embodiment, the $SiO_2$ QPM device is used as an SHG device. However, QPM devices using LiNbO3 crystal or the like has been known, which has periodically domain-inverted structure in the waveguide. Also a waveguide of organic materials with periodical structure is known as a QPM device. To fabricate the optical circuit with the similar function to described above using these types of devices, a portion of $SiO_2$ waveguide is removed and the device is inserted and bonded thereon.

Although the SHG device utilizing the second harmonic generation is shown in the preferred embodiment described above, higher order harmonic generation is also applicable. For example, a third harmonic generation (THG) device is formed by coating a silicon substrate with an organic molecule revealing third order optical non-linearity dispersed in an organic polymer matrix or a sol-gel material, The carrier frequency are up-converted three times. The similar effect as the SHG device can be obtained by detecting the converted signal. THG is more effective than SHG because wavelength conversion is larger.

What is claimed is:

1. An optical circuit comprising: a branching optical waveguide and a plurality of optical circuits, for receiving incident light of a first frequency, said waveguide and plurality of optical circuits being formed on a substrate and including a waveguide-type N-th order harmonic generation device (N is integer larger than 1) for converting said light of said first frequency to light of a second frequency, a light directing means for directing light of said second frequency out of said optical waveguide, and photodetector for detecting light of said second frequency directed out of said optical waveguide, wherein said optical circuits are coupled to output ports of said branching waveguide.

2. An optical circuit comprising:

a plurality of said optical circuits according to claim 1 connected in series.

3. An optical circuit according to claim 1 wherein said substrate is a Si substrate, and said optical waveguide includes $SiO_2$, organic materials or sol-gel materials, or compound materials of $SiO_2$, organic materials or sol-gel materials formed on the Si substrate.

4. An optical circuit according to claim 1 comprising:

a second harmonic generation device (N=2) wherein said second order harmonic generation device comprises an $SiO_2$ based optical waveguide having periodic structure of refractive index change in the core along the light propagation direction.

5. An optical circuit according to claim 1 comprising:

a third harmonic generation device (N=3) wherein said third order harmonic generation device comprises organic materials or sol-gel materials, or compound materials with these materials formed on the substrate.

6. An optical circuit according to claim 1, wherein said photodetector has a pn junction formed on or in said substrate.

7. An optical circuit according to claim 1, wherein said light emitting means is a Bragg diffraction grating fabricated on said optical waveguide.

8. An optical circuit according to claim 1, wherein said light directing means is a reflective filter which is disposed obliquely against the light propagation direction so as to reflect the guided light having a specific wavelength in direction to said photodetector.

9. An optical circuit according to claim 1 wherein said substrate is a Si substrate, and said optical waveguide includes $SiO_2$, organic materials or sol-gel materials, or compound materials with these materials formed on the Si substrate.

10. An optical circuit according to claim 2 comprising:
a second harmonic generation device (N=2) wherein said second order harmonic generation device comprises an $SiO_2$ based optical waveguide having periodic structure of refractive index change in the core along the light propagation direction.

11. An optical circuit according to claim 2 comprising:
a third harmonic generation device (N=3) wherein said third order harmonic generation device comprises organic materials or sol-gel materials, or compound materials with these materials formed on the substrate.

12. An optical circuit according to claim 8 wherein said substrate is a Si substrate, and said optical waveguide includes $SiO_2$, organic materials or sol-gel materials, or compound materials of $SiO_2$, organic materials or sol-gel materials formed on the Si substrate.

13. An optical circuit according to claim 8 comprising:
a second harmonic generation device (N=2) wherein said second order harmonic generation device comprises an $SiO_2$ based optical waveguide having periodic structure of refractive index change in the core along the light propagation direction.

14. An optical circuit according to claim 8 comprising:
a third harmonic generation device (N=3) wherein said third order harmonic generation device comprises organic materials or sol-gel materials, or compound materials with these materials formed on the substrate.

* * * * *